Dec. 10, 1963 CHRISTIAN-FRIEDRICH WOLF ET AL 3,114,010

METHOD AND MEANS FOR RECORDING AND REPRODUCING MAGNETIC SIGNALS

Filed Dec. 9, 1959 2 Sheets-Sheet 1

Dec. 10, 1963 R. O. WILEY 3,114,016

WIRING DEVICE FOR CONTROLLING CIRCUIT CONTINUITY

Filed May 26, 1960 3 Sheets-Sheet 1

WITNESSES:

Bernard R. Gieguez

Edward F. Possessky

INVENTOR

Roy O. Wiley

BY Donald Smith

ATTORNEY

United States Patent Office 3,114,010

Patented Dec. 10, 1963

3,114,010

METHOD AND MEANS FOR RECORDING AND REPRODUCING MAGNETIC SIGNALS

Christian-Friedrich Wolf and Walter Engel, Nurnberg, Germany, assignors to Siemens-Schuckertwerke Aktiengesellschaft, Berlin-Siemensstadt and Erlangen, Germany, a corporation of Germany Filed Dec. 9, 1959, Ser. No. 858,379

Claims priority, application Germany Jan. 31, 1959

4 Claims. (Cl. 179—100.2)

Our invention relates to methods and means for recording and reproducing magnetic main signals as well as auxiliary control signals on magnetizable tapes or other magnetogram carriers having two or more signal tracks.

It is often desired to record on such magnetogram carriers not only the sonic or other main signals proper, but also auxiliary signals to be used for controlling, regulating or other auxiliary purposes. This is desired, for example, if the recording or reproduction is to be synchronized with simultaneously occurring other events, as is the case when optical and acoustical presentations are to be reproduced simultaneously. Such synchronizing signals are applicable, for example, in television and motion picture techniques, or for timing a sequence of photographic slides projected upon a screen.

There is a known method operating with a pilot tone for synchronizing a magnetic sound-recording tape with the operation of a picture projector. For this purpose an alternating voltage, particularly a voltage of higher frequency than required for the recording of sound, may be recorded on the tape. There are different ways of doing this. One way is to keep the pilot tone within the normal frequency transmission range of the particular apparatus being used but to record the pilot tone on a second track parallel to the sound track. This has the disadvantage that a magnetic sound recording tape, otherwise applicable with two sound tracks, can be used only for recording a single sound track.

Another way is to give the pilot tone a frequency above the audible range or at least above the sonic frequency range to be transmitted by the equipment. This permits recording the pilot tone upon the same track area as the sonic signal. But this method has the serious disadvantage that, normally, the apparatus being used is not fully utilized over its full available frequency range. That is, when using equipment whose upper limit frequency is already so low as to leave no space for the recording of higher frequencies for control purposes, the application of the just mentioned principle necessitates further narrowing of the frequency range and thus impairs the transmission qualities.

It is therefore an object of our invention to afford the recording and reproducing of additional control signals without affecting in any manner the quality of recordation or reproduction of the main signal. Another more specific object relating to recording tapes with two sound tracks is to afford the accommodation of reliable auxiliary control signals without obviating or otherwise limiting the use of both main tracks.

According to our invention we utilize for recording and reproducing the auxiliary control signals a normally vacant, strip-shaped area which extends along the alternating flux magnetic track of the sound or main signals and constitutes the narrow margin directly adjacent to the track. When using a magnetogram carrier with two or more parallel tracks of main signals, the strip-shaped area for accommodating the control signals is preferably located between two such tracks.

The auxiliary control signals are recorded as individual alternating-flux or direct-flux magnetization and are spaced from each other in the longitudinal direction of the adjacent main-signal track. The intensity and geometric width of the control signals is so limited that no impairment or interference of the main signals on the adjacent track or tracks occurs. Recording the control signals as direct-flux magnetization, affords the further advantage that the polarizing direction of the individual signal magnetizations can be varied depending upon the particular type of signal to be recorded on a given carrier location. In this manner, another modification can be imposed upon the control signals. Furthermore, when operating with a twin-track magnetic sound tape in which one sound track is utilized when the tape runs in one direction whereas the other track is effective when the traveling direction of the tape is reversed, the possibility of giving the individual control signals a selected plurality can also be utilized for definitely correlating each individual control signal to one of the respective two sound tracks.

The terms direct-flux and alternating-flux magnetization are used as the magnetic analogy to direct-current and alternating-current or direct-voltage and alternating-voltage; that is direct-flux magnetization refers to a condition wherein each control signal on the magnetic carrier is magnetized along the carrier surface in but a single direction. Each signal thus displays but a single flux direction or "polarity" to its sensor, whereas in an alternating-flux magnetization the "polarity" alternates within each signal.

While the invention is preferably applicable with magnetizable recording tapes with two or more main-signal tracks extending lengthwise beside each other, the invention is analogously applicable to magnetogram carriers consisting of foils, endless belts or sleeves, discs or other record carriers on which the tracks are located beside each other, or in concentric relation on spirals or helices. Between these individual sound tracks there are normally non-utilized narrow interspaces which according to the invention are taken advantage of for accommodating the additional control signals.

The recording of the auxiliary signals, like the recording of the sonic or other main signals, can be effected by means of inductively operating transducers of conventional type. While for reproducing the main signals such an inductive transducer is likewise applicable, it is preferable to reproduce the recorded control signals by means of a transducer on the principle of a Hall-voltage generator. The use of such a Hall-voltage device for reproduction of the control signals has the advantage that direct-flux magnetic signals can be translated into corresponding voltages in a particularly favorable manner independently of the traveling speed of the magnetogram carrier. The use of Hall devices for this purpose also affords discriminating the control signals, in dependence upon their differences in polarization, as to their correlation to respectively adjacent sound tracks, although all of these control signals are located on a common intermediate strip area.

The voltage output electrodes (Hall electrodes) of the Hall generator can be connected with a direct-voltage amplifier. In many cases, however, it is preferable to employ an alternating-current amplifier in lieu of a direct-voltage amplifier. In order to then obtain amplification of the signal being reproduced from an individual direct-flux recording, an auxiliary alternating voltage can be supplied to the current supply terminals of the Hall plate to act as a carrier-frequency voltage. The Hall generator then operates as a modulator with the result that an alternating current amplifier such as a transistor amplifier can be operated directly from the output voltage available at the Hall electrodes, for the issuance or release of switching signals or other control commands. The reproduction of the control signals by means of Hall generators offers the further advantage that the signal intensity is independent of the track width.

The invention will be further explained with reference to the embodiments illustrated by way of example on the accompanying drawings in which.

Figure 1:
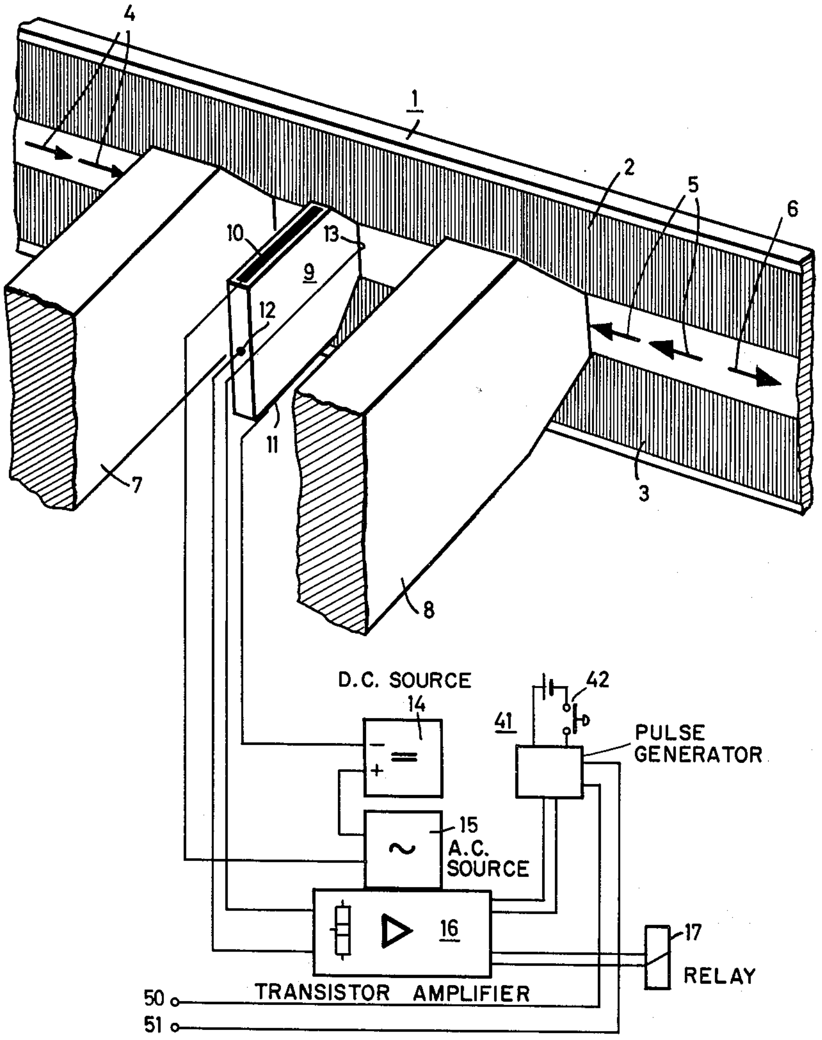
FIG. 1 shows a magnetizable recording tape according to the invention in conjunction with a recording transducer of the Hall generator type, as well as the circuitry required for operation of the transducer, the components of the transducer being shown exploded.
Figure 1:
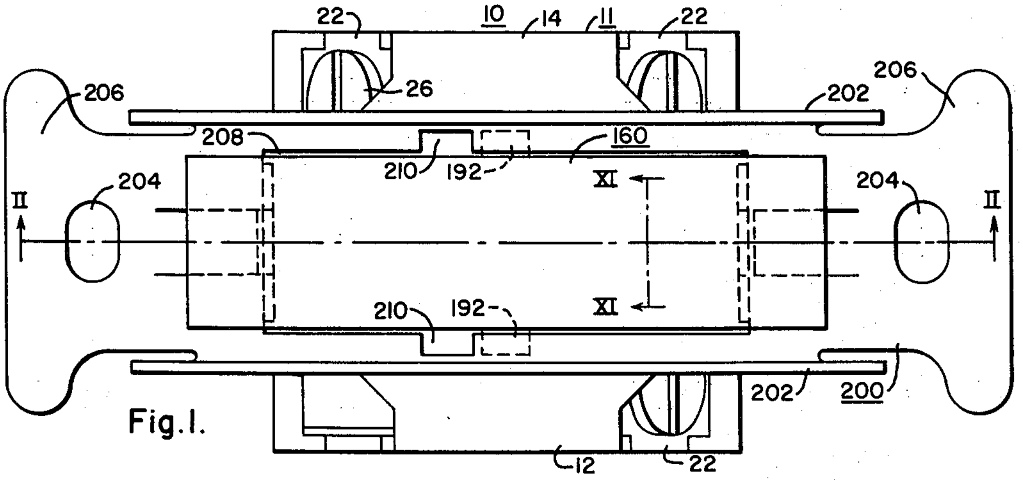

According to FIG. 1 the magnetizable recording tape 1 comprises two sound tracks 2 and 3 for the main signals. According to the invention the additional control signals are recorded in a strip area between the two sound tracks 2 and 3. The additional control signals are symbolically shown by arrows 4, 5 and 6 pointing in different directions to indicate that the individual magnetic recordings are magnetically unidirectional (direct-flux) but of respectively different polarities. This may signify that, for example, the arrows 4 and 6 are correlated to sound track 2, whereas the arrows 5 are correlated to track 3. By reversing the direction of the tape travel, or reversing the tape spool, the reversely polarized recordings of the control signals can be made effective.

The recording transducer head comprises two magnetizable plates 7, 8 consisting preferably of ferrite, and a Hall plate 9 (FIGS. 1, 3) in form of a thin semiconductor wafer or a thin semiconductor layer deposited upon one of the plates 7, 8 by vaporization or any other suitable method. The plate may consist of crystalline compound substance such as indium arsenide (In As) or indium antimonide (In Sb). Its thickness, as well as the width of the gap in which the plate is located, is extremely small, being preferably less than four microns or as little as about one micron. The Hall plate 9 carries two current-supply terminals or electrodes 10, 11 along opposite edges of the wafer. Mounted on the two other edges, halfway between the terminal electrodes, are two probe-type Hall electrodes 12, 13 from which the generated output voltage is taken off.

When current passes between terminal electrodes 10 and 11 through the semiconductor plate 9 while the plate is not subjected to a magnetic field between the ferrite plates 7 and 8, the two Hall electrodes 12 and 13 are located on equipotential points so that no voltage obtains between them. However, when a magnetic field between the ferrite plates 7, 8 is effective due to the presence of one of the control signals at the gap, the Hall electrodes 12 and 13 assume respectively different potentials so that a voltage occurs between them whose amplitude is substantially proportional to the intensity of the magnetic field caused by the signal.

The control current passing between terminal electrodes 10, 11 is supplied from a direct-current source 14 of constant voltage. If desired, and as shown, an additional source 15 of alternating voltage may also be connected to the terminal electrodes. In the latter case, the Hall voltage appearing between the Hall electrodes 12, 13 is an alternating voltage modulated in accordance with the signals being reproduced. The Hall electrodes 12, 13 are connected to the input stage of an alternating current transistor amplifier 16 which, when receiving a signal pulse from the Hall voltage generator, controls a relay 17 to perform a switching operation for the above-mentioned purposes.

Various means are applicable for causing the reproducing transducer to discriminate between the differences in magnetic polarity of the recorded control signals 5 and 4, 6. For example, a premagnetization may be imposed upon the transducer assembly by providing it with a permanent or direct-current magnet which imparts a definite polarization to the respective plates 7 and 8. Thus, the modified transducer head shown in FIG. 2 has the two magnetizable pole plates 7, 8 joined by a portion 48 so as to form a U-shaped core structure, and is provided with a winding 49, whose terminals 50, 51 can be connected to a current source of constant voltage to provide a unidirectional magnetic bias to make the transducer respond to direct-flux control signals of only one given polarity. However, suitable discriminating means may also be provided in the circuitry of the Hall electrodes for example by connecting a diode into the Hall-electrodes circuit, or by utilizing the direct-voltage source 14 for such polarizing purposes.

Figure 2:
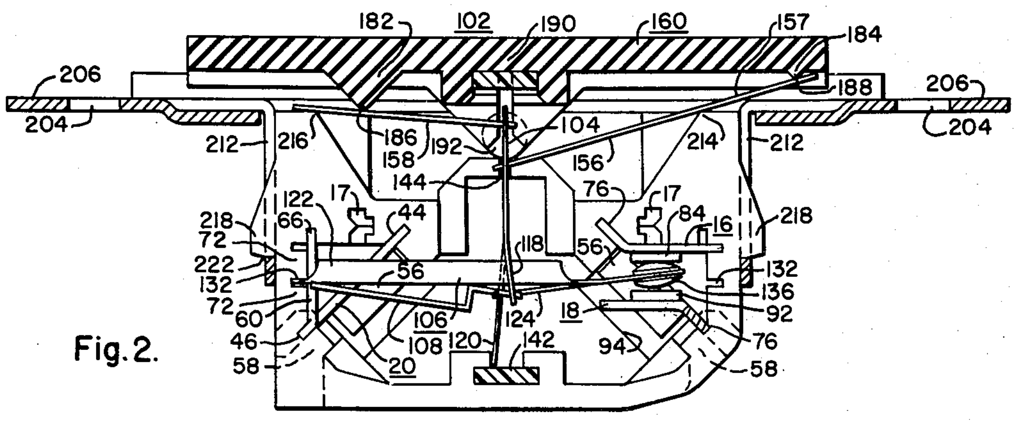
FIG. 2 is a partly sectional side view of a transducer according to FIG. 1 modified for selective use as recording or reproducing device.

A transducer head of the type shown in FIG. 2 may also be used for selectively recording and reproducing the magnetic signals, in which case the Hall plate is the sensing member for reproducing and the winding 49 serves for recording.

Figure 3:
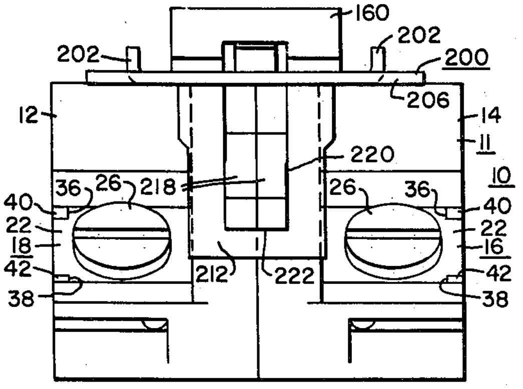
FIG. 3 is a side view of the Hall-voltage generating device applicable as a reproducing transducer according to FIG. 1.
Figure 2:
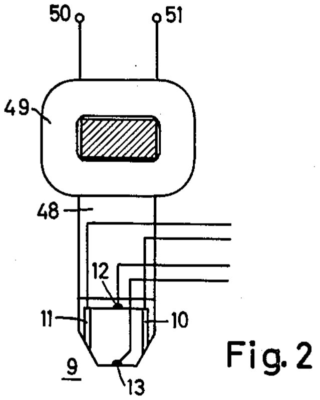
Figure 3:
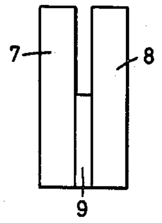
Figure 4:
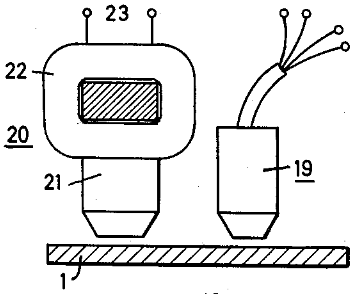
FIG. 4 is a sectional transversal view of the recording tape showing a Hall-voltage transducer for the control signals as well as a conventional inductive transducer for reproduction of the recorded sound.

In FIG. 4, the Hall-voltage generating transducer according to FIGS. 1 and 3 is denoted as a whole by 19. Also shown in FIG. 4 is a conventional electromagnetic transducer 20 for reproducing one of the two sound tracks. This transducer comprises a magnetic core and an inductance coil 22 whose terminals 23 are to be connected in the conventional manner through an amplifier with a loudspeaker. The four terminals of the Hall-voltage generating transducer 19 are to be connected as shown in FIG. 1. During reproducing operation, the transducer 19 issues from time to time a control signal for synchronizing or signaling purposes. For example, when the magnetic tape is being used for reproducing a lecture accompanied by a demonstration of photographic slides, the transducer 19 may issue to an attendant a signal for changing from one to the next slide or may release relay as shown at 17 in FIG. 1, which automatically controls the exchange of slides.

An apparatus for producing a combined sound track and control signal record on a single tape as described above will be described presently with reference to FIG. 5.

A recording tape 1 passes at constant speed from a supply spool 31 between guide rollers 32 and 34 onto a take-up spool 35.

For recording a sound track, for example track 2 (FIG. 1), on tape 1, a conventional electromagnetic transducer 36 is used which may correspond to the transducer 20 used for reproducing purposes according to FIG. 4. The transducer 36 receives audio-frequency current through an amplifier 37 from a microphone 38. The device is further provided with a likewise electromagnetic transducer 39 whose excitation coil 40 is connected with a one-shot pulse generator 41 controlled by means of a normally open pushbutton contact 42. When, for example, a lecture is to be recorded that is to be accompanied by demonstration of slides as mentioned above, the person speaking into the microphone 38 need only actuate the pushbutton 42 at the moment when he desires to change to the next following slide. The pulse generator 41 then issues a single polarized direct-current pulse to the winding 40 in order to produce a unipolar individual control signal on the proper strip area of the tape as explained above. The polarity of the recorded control signals can be reversed by changing the position of a pole-changing switch 43.

As mentioned, a transducer of the type shown in FIG.

Figure 5:
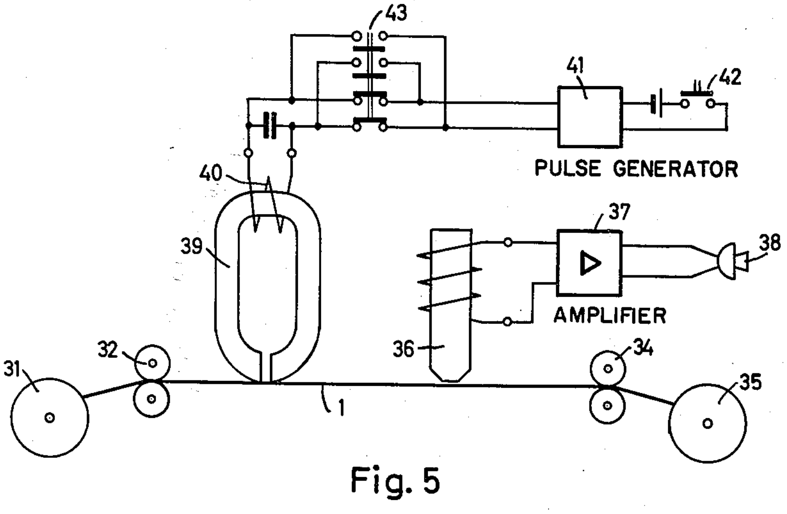
FIG. 5 is a schematic diagram showing the recording tape in conjunction with an electromagnetic recording transducer for the sound track and another likewise electromagnetic transducer for recording the control signals.

2 may also be used for recording purposes instead of the transducer 39 in FIG. 5. When using such a double purpose transducer, or using a separate recording transducer (FIGS. 1, 2) in addition to a reproducing transducer for the control signals, it may happen that after a sound track 2 (FIG. 1) and correlated control signals are recorded on the tape, any additional control signals to be recorded when subsequently the other sound track 3 is impressed upon the tape, may by chance be placed on a location where previously a signal pulse correlated to track 2 was recorded. Such double record in the just mentioned sense may cause erasing of the first signal by the second, due to the fact that the second signal has the reversed polarity. Consequently, some of the control signals may be incorrectly reproduced. This, however, can be avoided by slightly delaying the recording of the second pulse so that it is placed behind the previously recorded pulse, and to simultaneously indicate by a signal that the second pulse was not produced at the desired moment. A correction can then be made from case to case, if necessary.

The just-mentioned method can be performed as follows. When recording the second sound track 3 (FIG. 1) and the appertaining control signals, the recording transducer winding, such as winding 49 in FIG. 2 or winding 40 in FIG. 5, is intermittently energized by direct-current pulse from the pulse generating device 41 under control by the push-button switch 42 (FIGS. 1, 5). At the same time, the previously recorded control signals for the first sound track 2 is sensed off by the reproducing transducer shown in FIG. 1. The amplifier 16, responding to the previously recorded control signals, has an output line connected to the pulse generating device for delaying the issuance of a pulse when, and as long as, a previously recorded pulse is being amplified.

It will be obvious to those skilled in the art upon a study of this disclosure that our invention permits of various modifications and may be embodied in equipment other than particularly illustrated and described herein, without departing from the essence of the invention and within the scope of the annexed claims in which the term "transduce" is used, in verbal analogy to the noun "transducer," as referring to a conversion or translation between magnetic and electric forms of energy, particularly to conversion of magnetic signals to electric voltages and vice versa.

We claim:

1. The method of recording and reproducing magnetic main signals and auxiliary control signals by means of magnetizable magnetogram carriers, which comprises transducing the magnetic main signals upon and from a strip-shaped track area while leaving an adjacent parallel strip area of the carrier free of main signals, transducing for one of said main signals a plurality of shorter individual and longitudinally spaced magnetic control signals upon and from said adjacent strip so as to define along one surface of the carrier magnetic flux lines oriented in one direction, and transducing for another of said main signals a plurality of shorter individual and longitudinally spaced magnetic control signals upon and from said adjacent strip area so as to define along one surface of the carrier magnetic flux lines oriented in another direction.

2. The method of recording magnetic main signals and auxiliary control signals on magnetizable magnetogram carriers, which comprises transducing alternating-flux magnetic main signals upon two strip-shaped and parallel tracks in mutually spaced relation to each other so as to leave an intermediate strip area free of said main signals, transducing for one of said tracks a plurality of shorter individual and longitudinally spaced magnetic control signals upon and from said adjacent strip so as to define along one surface of the carrier magnetic flux linest oriented in one direction, and transducing for the other of said tracks a plurality of shorter individual and longitudinally spaced magnetic control signals upon and from said adjacent strip area so as to define along one surface of the carrier magnetic flux lines oriented in another direction.

3. The method of recording sound as well as control signals upon magnetizable recording tape, which comprises transducing magnetic sound signals along the tape while leaving an adjacent strip area free, transducing for one of said sound signals a plurality of shorter individual and longitudinally spaced magnetic control signals upon said adjacent strip area so as to define along one surface of the carrier magnetic flux lines oriented in one direction, transducing for another of said sound signals a plurality of shorter individual and longitudinally spaced magnetic control signals upon said adjacent strip area so as to define along one surface of the carrier magnetic flux lines oriented in another direction.

4. The method of recording and reproducing sound as well as control signals by means of magnetizable recording tape, which comprises transducing two parallel and mutually spaced sound tracks onto and from the tape, transducing for one of said main signals a plurality of shorter individual and longitudinally spaced magnetic control signals upon and from said adjacent strip area so as to define along one surface of the carrier magnetic flux lines oriented in one direction, and transducing for another of said main signals a plurality of shorter individual and longitudinally spaced magnetic control signals upon and from said adjacent strip area so as to define along one surface of the carrier magnetic flux lines oriented in another direction.

References Cited in the file of this patent

UNITED STATES PATENTS

| | | |
|---|---|---|
| 2,734,948 | Mueller | Feb. 14, 1936 |
| 2,615,989 | Thad | Oct. 28, 1952 |
| 2,843,446 | Pettus et al. | July 15, 1958 |
| 2,866,013 | Reis | Dec. 23, 1958 |
| 2,900,451 | Havstad | Aug. 18, 1959 |
| 2,923,589 | Curtis | Feb. 2, 1960 |
| 2,975,672 | Shields | Mar. 21, 1961 |
| 3,041,415 | Gratian | June 26, 1962 |